United States Patent

Miles

[15] 3,678,386
[45] July 18, 1972

[54] APPARATUS FOR DETECTING MOTION AND INDICATING SPEED

[72] Inventor: Marshall Miles, Wilmette, Ill.
[73] Assignee: Vapor Corporation, Chicago, Ill.
[22] Filed: Nov. 4, 1970
[21] Appl. No.: 86,846

[52] U.S. Cl. .................................. 324/174, 310/67, 310/155
[51] Int. Cl. .......................................................... G01p 3/48
[58] Field of Search .............. 324/161, 163, 165, 171, 173, 324/174; 310/155, 168, 67

[56] References Cited
UNITED STATES PATENTS 3,596,122  7/1971  Stewart..............................310/67

Primary Examiner—Michael J. Lynch
Attorney—Julian Falk, Chester A. Williams, Jr., Marshall J. Breen and Kinzer, Dorn & Zickert

[57] ABSTRACT

Apparatus for determining whether an axle on a railroad vehicle is locked and for determining axle speed including a permanent magnet and coil assembly fixed to a bearing box and arranged within a splined hole of the axle, and a voltage or frequency responsive indicator connected to the coil.

5 Claims, 7 Drawing Figures

PATENTED JUL 18 1972 3,678,386

INVENTOR
MARSHALL MILES
BY
ATTORNEY

3,678,386

APPARATUS FOR DETECTING MOTION AND INDICATING SPEED

This invention relates in general to an apparatus for use on railroad vehicles, and more particularly to an apparatus capable of detecting locked axle conditions on a railroad vehicle and axle speed.

Heretofore, there have been devices for determining whether an axle on a railroad vehicle is locked, and there have also been devices for indicating axle speed. However, such devices have been relatively complex in construction and costly.

The apparatus of the invention, while especially suitable for use on locomotives, can be used on other railroad vehicles. It has been usual for locomotives to have axles with splined holes in at least one end for the purpose of driving a shaft with a gear thereon in coaction with a magnetic coil to function as a speed and motion indicator. The present invention utilizes the splined hole in conjunction with a permanent magnet and coil assembly for driving an indicator to determine motion and speed of the axle. The permanent magnet and coil assembly is held stationary by a coupling connected to the axle bearing box, wherein the splined hole of the axle rotates relative the assembly.

Accordingly, it is an object of the present invention to provide a new and improved motion and speed detector for railroad vehicle axles.

A further object of this invention is in the provision of a motion and speed detector for railroad vehicles that is arranged in conjunction with an axle and bearing box, and which is substantially less costly than any device heretofore proposed.

Other objects, features and advantages of the invention will be apparent from the following detailed disclosure, taken in conjunction with the accompanying sheets of drawings, wherein like reference numerals refer to like parts, in which.

Figure 1:
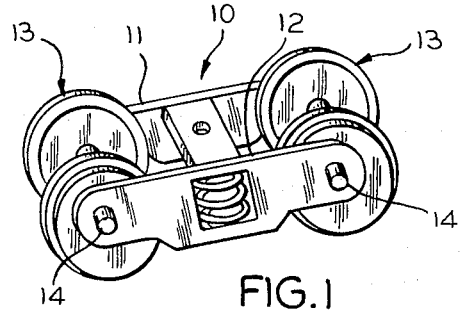
FIG. 1 is a somewhat diagrammatic view of a truck for a railroad vehicle, the invention being associated with the bearing box and axle of the truck.
Figures 2, 4:
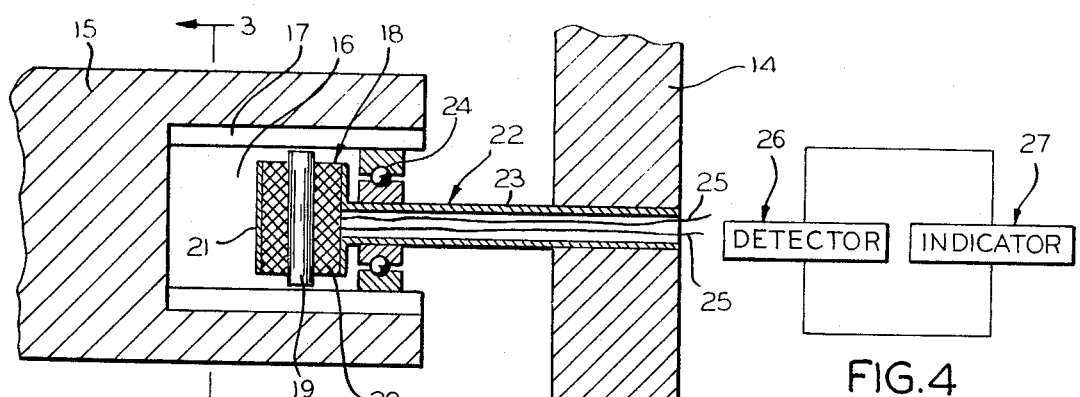
FIG. 2 is an axial sectional view, generally diagrammatic of the motion and speed detector of the invention.
FIG. 4 is a block diagram of the invention.

Referring now to the drawings, and particularly to FIG. 1, a typical truck 10 for a railroad vehicle is illustrated which includes side frames 11 and 12, two sets of axle-wheels 13, and bearing boxes 14 for journalling the ends of the axles. As seen in FIG. 2, the axle is represented by the numeral 15 while the bearing box is represented by the numeral 14, it being understood that the bearing box is stationary relative the truck 10.

Figure 3:
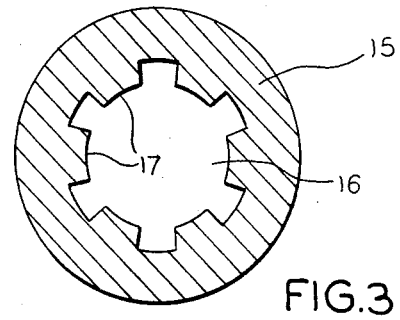
FIG. 3 is a transverse sectional view taken substantially along line 3—3 of FIG. 2.

The embodiment of the invention illustrated diagrammatically in FIGS. 2 and 3 includes a splined hole 16 having a plurality of axially extending and circumferentially spaced splines or teeth 17. A permanent magnet and coil assembly 18 is positioned within the splined hole 16. The assembly includes a bar magnet 19 and a coil 20 wound therearound. The assembly is mounted in the tubular end portion 21 of a tubular T-shaped structure 22. A tubular stem portion 23 which extends from the tubular end portion 21 is arranged substantially coaxial with the axle 15 and bearingly supported within the splined hole by a bearing 24. The free end of the tubular stem portion 23 is suitably secured to the bearing box 14. Leads 25 from the coil 18 may conveniently be extended through the tubular stem portion 23 and connected to a suitable indicator.

Referring to FIG. 4, the detector or combination splined hole and permanent magnet and coil assembly, indicated by the numeral 26 is electrically connected to an indicator 27. In operation, the axle 15 rotates relative the permanent magnet and coil assembly 18, thereby changing the reluctance of the flux path of the magnet 19 which induces a voltage in the coil 20 that drives the indicator 27. The detector produces an alternating wave form in synchronism with the passage of the splines 17 relative the ends of the bar magnet 19 which are in gapped relation with the splines. Thus, the indicator 27 is a voltage responsive device for detecting the voltage induced in the coil 20.

Figure 5:
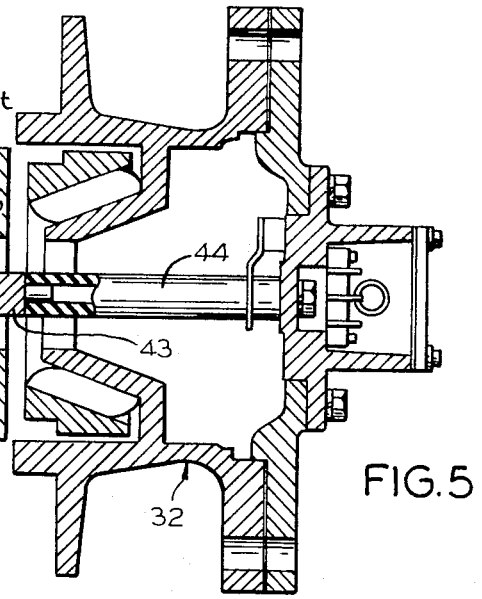
FIG. 5 is a fragmentary axial sectional view taken through an exemplary installation of the invention.
Figure 6:
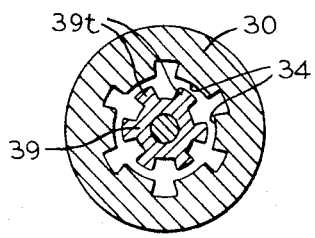
FIG. 6 is a transverse sectional view taken substantially along line 6—6 of FIG. 5.
Figure 7:
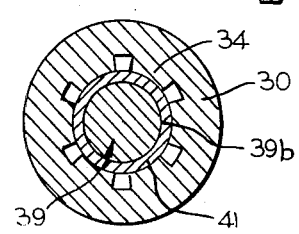
FIG. 7 is a transverse sectional view taken substantially along line 7—7 of FIG. 5.

The present invention in a preferred form is illustrated in FIGS. 5 to 7, wherein the axle 30 is bearingly supported at each end, such as by a suitable sleeve bearing (not shown) and which would be supported by the bearing box 32. The end of the axle 30 is provided with a splined hole 33 having a plurality of axially extending and circumferentially spaced splines or spline teeth 34.

The coil and permanent magnet assembly 35 of the detector 36 according to the invention is arranged within the splined hole 33. The assembly includes a bar magnet 37 extending coaxial with the splined hole and the axle, and surrounded by a coil 38. Magnetic pole pieces 39 and 40 abut against the opposite ends of the bar magnet 37. An extension 39a is provided on the pole piece 39 for gauging the depth of positioning of the assembly by abutting against the bottom of the splined hole. Each pole piece respectively includes a plurality of circumferentially spaced teeth 39t and 40t which are in gapped and coacting relation with the splines 34, and bearing surfaces 39b and 40b onto which are rotatably supported sleeve bearings 41 and 42. The sleeve bearings in turn are in abutting and supporting relation with the splines 34, thereby bearingly supporting the magnet and coil assembly within the splined hole. Since the axle 30 may move laterally, the fit between the bearings 41 and 42 and the splines 34 is such as to permit relative axial movement.

The pole piece 40 is connected to the bearing box cover 32 to prevent rotation of the coil and magnet assembly relative to the bearing brought by a suitable means such as a rod 43 and a resilient coupling 44, the latter of which might take the form of a rubber hose if desired. The leads for a coil 35 may be brought through a lead hole 45 and then taken into the bearing box for attachment to a distribution panel that ultimately can be connected to the indicator.

The operation of the illustrated embodiment of FIGS. 5 to 7 is in general the same as the diagrammatic illustration in FIG. 2, wherein movement of the pole piece teeth relative the axle splines causes a changing of the reluctance of the bar magnet flux path to induce a voltage having an alternating wave form in the coil 35. The voltage signal is read out by a suitable indicator to indicate whether the axle is in a locked condition, and also to indicate the speed of the axle.

It will be understood that modifications and variations may be effected without departing from the scope of the novel concepts of the present invention, but it is understood that this application is to be limited only by the scope of the appended claims.

The invention is hereby claimed as follows:

1. In combination with a truck of a railroad vehicle, wherein the truck includes at least one set of opposed bearing boxes supported thereby and a wheeled axle bearingly supported by the bearing boxes, means for detecting a locked axle and the axle speed comprising, a splined hole in one end of the axle defining a plurality of circumferentially arranged splines, a permanent magnet and coil assembly rotatably mounted within the splined hole, said permanent magnet and coil assembly including a bar magnet with a coil therearound arranged so that upon rotation of the axle the splines change the reluctance of the flux path of the bar magnet, means connecting the assembly to the adjacent bearing box to prevent rotation therewith but effect relative rotation between the assembly and the axle when the axle is rotating thereby causing voltage to be induced in the coil, said connecting means including a flexible coupling, and a voltage responsive indicator connected to the coil.

2. In combination with a truck of a railroad vehicle, wherein the truck includes at least one set of opposed bearing boxes supported thereby and a wheeled axle bearingly supported by the bearing boxes, means for detecting a locked axle and the axle speed comprising, a splined hole in one end of the axle defining a plurality of circumferentially arranged splines, a permanent magnet and coil assembly rotatably mounted within the splined hole, said permanent magnet and coil assembly including a bar magnet, the longitudinal axis of which is coaxial with the axle and splined hole, a coil surrounding the bar magnet, and a magnetic pole piece at each end of the bar magnet having circumferentially arranged teeth in spaced relation to said splines, whereby rotation of the axle causes the splines to coact with the pole piece teeth to change the reluctance of the flux path of the bar magnet, means connecting the assembly to the adjacent bearing box to prevent rotation therewith but effect relative rotation between the assembly and the axle when the axle is rotating thereby causing voltage to be induced in the coil, and a voltage responsive indicator connected to the coil.

3. The combination as defined in claim 2, and means carried by said splines for bearingly supporting said assembly within the splined hole.

4. The combination as defined in claim 2, and bearings carried by said splines journalling said pole pieces.

5. The combination as defined in claim 4, wherein said connecting means includes a flexible coupling.

* * * * *